United States Patent [19]

Baxi et al.

[11] Patent Number: 5,066,214

[45] Date of Patent: Nov. 19, 1991

[54] INJECTION MOLDING APPARATUS

[75] Inventors: Indra R. Baxi, Troy; Erik E. Erikson, Grosse Pointe Shores, both of Mich.

[73] Assignee: Encore Molding Systems, Inc., Mt. Clemens, Mich.

[21] Appl. No.: 266,477

[22] Filed: Nov. 2, 1988

[51] Int. Cl.⁵ .................. B29C 45/20; B29C 45/34; B29D 22/00
[52] U.S. Cl. .................... 425/190; 264/572; 425/546; 425/567; 425/568; 425/812
[58] Field of Search .............. 264/101, 102, 328.1, 264/328.8, 328.12, 572; 425/190, 191, 192 R, 546, 567, 568, 573, 812

[56] References Cited

U.S. PATENT DOCUMENTS

| | | |
|---|---|---|
| 3,687,582 | 8/1972 | Hendry et al. ............ 425/4 R |
| 4,101,617 | 7/1978 | Friederich ............... 264/572 |
| 4,136,220 | 1/1979 | Olabisi ................. 264/572 X |
| 4,474,717 | 10/1984 | Hendry ................. 264/572 X |
| 4,740,150 | 4/1988 | Sayer ................... 425/573 X |
| 4,781,554 | 11/1988 | Hendry ................... 425/4 R |
| 4,855,094 | 8/1989 | Hendry ................. 264/572 X |

FOREIGN PATENT DOCUMENTS 57-14968  3/1982  Japan.
2139548  11/1984  United Kingdom.

*Primary Examiner*—Leo B. Tentoni
*Attorney, Agent, or Firm*—Dykema Gossett

[57] ABSTRACT

A method and apparatus for making a plastic injection molded part with a smooth surface or skin and a hollow core wherein thermoplastic material is injected as a molten stream into the mold cavity through a sprue bushing fixed in the mold. Simultaneously, an unmeasured quantity of inert gas is introduced through an adapter into the molten stream at the sprue bushing substantially coaxially with the melt stream and at a pressure sufficient to penetrate the thermoplastic material to form a gas cavity in the molten material in the mold. For retrofitting an existing mold, an adapter can be added to the existing sprue bushing. During plastic injection and cooling in the mold the gas is maintained at a high pressure, preset, constant and adequate to maintain the plastic against the mold surface until it is self-supporting. The gas is exhausted from the mold, back through the sprue bushing and adapter, before the mold is opened. Adequate preset high pressure is maintained at the gas supply by a large cylinder having a positive displacement member therein that is controlled by a pressure sensor in the gas pressure line to the mold to maintain preset adequate gas pressure within the cavity.

9 Claims, 1 Drawing Sheet

INJECTION MOLDING APPARATUS

BACKGROUND OF INVENTION

1. Field of Invention

The present invention relates to apparatus and methods for making injection molded thermoplastic parts, particularly gas assisted injection molding of parts having a smooth outer skin and a hollow core.

2. Prior Art

Various injection molding techniques have heretofore been proposed to use less material and achieve weight and cost reduction while maintaining structural properties and providing a smooth outer surface or skin that does not require sanding or other finishing. Blowing agents, including gas, can be used to provide a porous, foamed or cellular core and in some cases a hollow core. When gas is used to form a hollow core, the gas can be injected into the plastic melt stream at the nozzle or directly into the mold, preferably in a controlled manner to achieve the desired core structure.

Hendry U.S. Pat. No. 4,474,717 discloses several apparatus and methods wherein gas is injected into the mold by means of a gas injection probe. A small amount of plastic is first injected into the mold to encapsulate a gas injection probe and thereafter gas is injected through the probe while injection of the plastic continues to form the desired core structure. At the end of the molding operation gas pressure in the mold is relieved by exhausting the mold cavity through the probe which acts as a decompression valve. A similar gas injection - decompression valve in the mold is also disclosed in Sayer U.S. Pat. No. 4,740,150. In both the Hendry and Sayer patents the gas injection probe or nozzle is shown mounted in that half of the mold opposite the mold half through which the plastic is injected, as from a reciprocating screw injection molding machine. Although injecting and/or exhausting gas into the mold cavity in the manner taught by the Hendry and Sayer patents may well provide the desired core structure, modification of each mold is required to accommodate the gas injection nozzle or probe. This may be expensive and involves care in selecting the location of the gas injection nozzle, particularly in multiple cavity molds and in retrofitting existing molds.

Other gas injection techniques have also been proposed wherein the gas or a foaming agent is introduced into the melt stream prior to the mold cavity at the nozzle of the plastic injector as shown in Friedrich U.S. Pat. No. 4,101,617 or into the cavity after plastic injection by a special manifold as shown Olabisi U.S. Pat. No. 4,136,220. Again, modification of the nozzle or manifold may also be expensive and require changing the nozzle or manifold for different applications depending on the part being molded by that machine.

Other gas injection locations have also been suggested. U.S. Pat. No. 4,498,860 (Gahan) discloses an inclined retractable piston mounted in a mold half that can be extended to close off a reverse taper sprue passageway and thereby cut off the sprue. A small pipe coaxial with the piston is disclosed for injecting gas into the plastic material to flow with the plastic through the mold space. Here again rather elaborate modification of the mold is required to accommodate the holder for the sprue cut-off piston. The inclined orientation of the gas injection tube would undoubtedly cause uneven distribution of the gas in the plastic entering the mold and otherwise detract from effective gas injection.

Whether gas is injected into the mold as in the Sayer and Hendry patents or into the melt stream before the mold as in the Friedrich patent, the gas injection should be compatible with different gas injection systems to precisely control injection of the gas. This may require further modification of the nozzle or the mold which in turn adds to expense, particularly where the gas injection system is installed as a retrofit for an existing mold to make a previously solid part into a hollow core part.

In retrofitting existing injection molding equipment and molds, as well as with new equipment, various techniques have been proposed to more precisely control the gas injection and achieve the desired core structure repeatably over long production runs. One approach is described in general terms in the aforementioned Sayer U.S. Pat. No. 4,740,150 and in British Patent Specification No. 2,139,548 referred to therein, wherein a preselected or measured volume of pressurized gas is injected into the mold during each molding cycle.

A process using what may be generally termed as preset pressure has also been proposed in Baxi European application, Application No. 87304002.6, filed May 5, 1987, published Dec. 12, 1987, Publication No. 0250080A2, Bulletin 87/52. With this process, as contrasted to the preset volume technique, the quantity of gas that is introduced into the mold is not directly measured but only the pressure of the gas is controlled. A gas supply source is provided along with gas pressurization means for pressurizing the gas to a preset pressure which is at least as great as the pressure at which the molten plastic material is introduced into the mold. A storage chamber is provided for storing gas at the preset pressure so that the gas is immediately available for use when injection of the plastic material is initiated. Gas pressure maintains the plastic against the surfaces of the mold cavity as the plastic cools and until the plastic can sustain the form dictated by the mold to provide an essentially hollow part. As set forth in European Patent Publication 0,250,080, prior to injection of the plastic, a high pressure gas storage tank is fully charged at the pressure preset for that molding operation. Just after plastic injection is initiated, high pressure gas from the storage tank is injected into the plastic melt steam by a feed chamber in the nozzle. The high pressure tank is charged and recharged by a pump controlled by a pressure switch so that sufficient gas in the high pressure tank is always available at the preset pressure. Asahi Dow Ltd. Japanese Application No. 120318/1973, filed Oct. 25, 1973, published Mar. 27, 1982, Publication No. 14968/1982, shows a similar arrangement for injecting gas via a high pressure piston or ram and injection inlet at the nozzle.

Although the preset volume and preset pressure processes described in the prior art may well provide improved results as contrasted to gas injection that is not as precisely controlled, both processes have disadvantages that detract from precise and repeatable control of the gas injection. In the constant volume process it is difficult to maintain repeatability over many molding cycles due to variations inherent with constant volume cylinder and piston arrangements caused by wear and other variations with time and extended use. In the preset pressure method using a high pressure storage tank that must be replenished, the preset pressure can and will vary during an injection cycle as gas is released from the tank and replenished by the pump.

Accordingly it is desirable to provide improved methods and apparatus for injection molding of hollow parts which overcome the foregoing and other difficulties while providing better and more advantageous overall results.

BRIEF SUMMARY OF THE INVENTION

In accordance with the present invention new and improved methods and apparatus are provided for producing a hollow injection molded part.

More particularly, in accordance with the present invention there is provided a method and apparatus for making a plastic injection molded part with a smooth surface or skin wherein thermoplastic material is injected as a molten stream into the mold cavity through a sprue bushing fixed in the mold. Simultaneously, an unmeasured quantity of inert gas is introduced through an adapter into the molten stream at the sprue bushing substantially coaxially with the melt stream and at a pressure sufficient to penetrate the thermoplastic material to form a gas cavity in the molten material in the mold. For retrofitting an existing mold, an adapter can be added to the existing sprue bushing. For new molds the sprue bushing is modified at the nozzle end.

In the preferred embodiment, during plastic injection the gas is maintained at a high pressure, preset, constant and adequate to maintain the plastic against the mold surface until it is self-supporting. The gas is exhausted from the mold, back through the sprue bushing and adapter, before the mold is opened. Adequate preset high pressure is maintained at the gas supply by a large cylinder having a positive displacement member therein that is controlled by a pressure sensor in the gas pressure line to the mold to maintain preset adequate gas pressure within the cavity.

The principal object of the present invention is to overcome, or at least minimize, the disadvantages of prior art gas assisted injection molding and provide methods and apparatus for gas assisted injection molding that produce a superior plastic part having a hollow cavity therein and a smooth outer surface and reduced sink marks and part warp and which are effective, efficient and economical and provide greater flexibility using conventional injection molding equipment.

BRIEF DESCRIPTION OF THE DRAWINGS

The above objects and other features and advantages of the present invention will be apparent from the following detailed description, appended claims and accompanying drawings in which:

It will be understood that the drawings described above merely illustrate a preferred embodiment of the present invention and that other embodiments are contemplated within the scope of the claims hereinafter set forth.

DETAILED DESCRIPTION OF THE DRAWINGS

Figure 1:
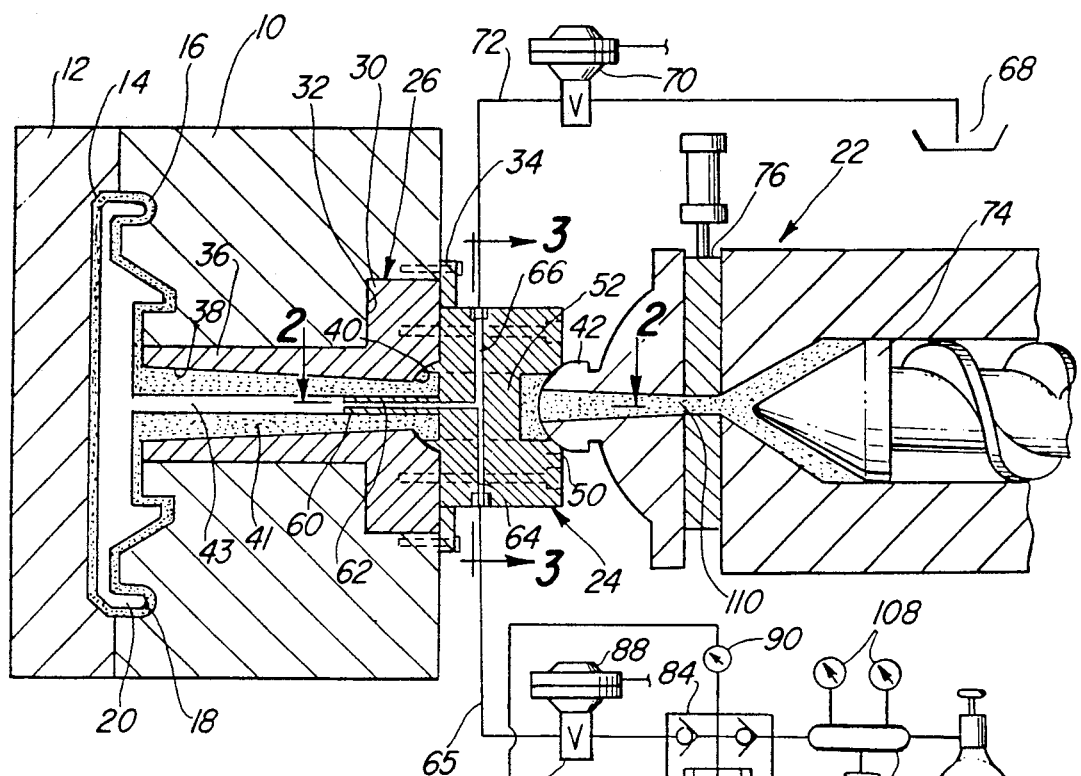
FIG. 1 is a fragmentary elevational plan view, partly in cross section, schematically illustrating a mold with a sprue bushing, a sprue bushing adaptor, a reciprocating screw injection molding machine and a pressurized gas supply system.

Referring generally to the molding apparatus shown in FIG. 1, a stationary mold half 10 and a moveable mold half 12 are shown in their closed position defining a mold cavity 14 for molding a plastic part 16 having an outer shell 18 a hollow core 20. Plastic is injected into cavity 14 through a sprue bushing adapter 24, and a sprue bushing 26. Gas from a supply system designated generally at 28 is introduced into the melt stream at sprue passage 38 via adapter 24. In the embodiment being described adapter 24 has been retrofitted to an existing mold already having a conventional sprue bushing 26. Existing molds are retrofitted when it is desired to convert molding of a solid part to molding the same part with a hollow core such as core 20.

Figure 2:
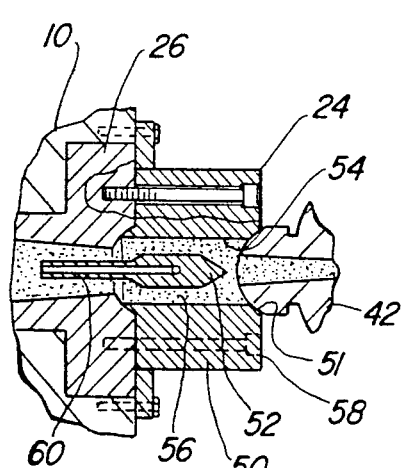
FIG. 2 is an enlarged fragmentary sectional view taken on lines 2—2 of FIG. 1.
Figure 3:
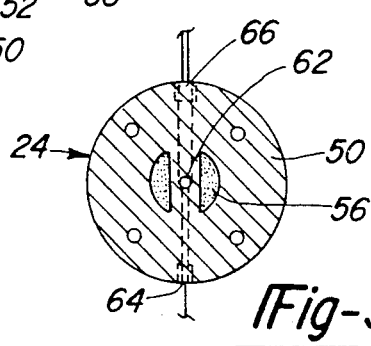
FIG. 3 is an enlarged fragmentary sectional view taken on lines 3—3 of FIG. 1.

Referring to FIGS. 1-3 in greater detail bushing 26 has a flanged head 30 mounted in a recess 32 in mold half 10 by a press fit and by a retaining plate 34 bolted on mold half 10. A bushing sleeve 36 integral with head 30 extends through mold half 10 and has an outwardly tapered sprue passage 38 opening into cavity 14 at the left end as viewed in FIG. 1. Sleeve 36 may also be press fitted in mold half 10. Sprue passage 38 opens at its narrow end in head 30 at a hemispherical recess 40 that provides a seat for a nozzle 42 of injection molding machine 22 prior to retrofit. At the completion of an injection, passage 36 contains a sprue in the area generally designated at 41 and the sprue will have a gas channel 43 therethrough.

As is generally well known sprue bushings such as bushing 26 provide inexpensive protection of the mold so that damage occurs at the bushing which can be replaced inexpensively. To this end, sprue bushing 26 typically is made of hardened steel to withstand the impact of the nozzle, both during setup and repeated injection cycling as the injection forces are applied at the interface between bushing 26 and nozzle 42.

Sprue passage 38 conventionally has a ground and highly polished finish to minimize friction with the melt and thereby minimize frictional heating of the plastic that would cause degradation and burn spots in the finished product. Repeated injection through the sprue passage 38 will, over extended use, scratch and scorch the surface due to the abrasiveness of the plastic material. This wear and surface imperfection may be pronounced with glass filled plastic, for example. A worn sprue passage, particularly at high injection speeds, also causes turbulence and frictional flow at the walls, creating undesirable pressure drops, interfering with proper filling of the mold and impairing the flow of the plastic to the mold extremities. In any event, conventional sprue bushings provide an inexpensive way to repair the damage by replacing the bushing. Although bushing 36 is illustrated as unheated, it should be understood that the present invention is equally applicable to heated sprue applications.

Sprue bushing adapter 24 comprises a steel body 50 having an integral torpedo like web 52 transverse of a through passage 54 in body 50 splitting passage 54 into two aperatures 56 at the torpedo web. Body 50 is also hardened steel and has a nozzle seat 51 and at the inlet end of passage 54. Body 50 is bolted on bushing 26 at 58 and may also be silver soldered at the interface with head 30 and recess 40 to eliminate flash. Web 52 has an integral needle-like gas injection probe or nozzle 60 extending coaxially within sprue passage 38 and having a gas passage 62 therein. Adapter 24 has opposed radial gas inlet and exhaust passages 64, 66 that extend through web 52 and communicate at their inner ends at a T connection with passage 62 in nozzle probe 60. Inlet passage 64 is connected at its outer end to gas supply system 28 via a high pressure line 65. Exhaust passage 66 is connected to a decompression baffle 68 via a solenoid operated valve 70 and line 72. Preferably exhaust passage 66 has a larger diameter, than passage 64, say twice as large, so as not to get plugged if plastic is sucked back when cavity 14 is decompressed. Although probe 60 is illustrated projecting slightly into sprue passage 38, it can be longer or shorter, depending on the specific application. In one application the probe opened generally in line with the juncture of recess 32 and sprue passage 38 and in another application extended nearly to cavity 14. In both cases, however, the passage 62 was coaxial with the sprue bushing to inject gas coaxially into the melt stream in the direction material flow.

Injection molding machine 22 has a conventional reciprocating screw 74 and cylinder operated shut-off valve 76. In FIG. 1, screw 74 is shown at the end of its stroke just prior to closing of the valve 76 with part 16 substantially fully formed.

Pressurized gas is provided to sprue bushing adapter 24 during the injection stroke via a line 65 from a high pressure chamber 82 through a check valve assembly 84 and a valve 86 operated by solenoid 88. The gas pressure in chamber 82 is monitored by a gas pressure indicator-sensor 90 that provides an electrical output signal to controller 92 via lead 94 when the gas pressure falls below a present pressure. When gas in chamber 82 is delivered to pressure line 65 through check valve assembly 84 and valve 86, piston rod 96 is moved by an hydraulic cylinder 98 which in turn is operated by controller 92 to decrease the volume of chamber and maintain constant pressure. Rod 96 projects into chamber 82 but has no sliding seals on the chamber walls 99. Rather rod 82 extends downwardly through the walls of cylinder 98 and chamber 82 and wet metallic seals 100 to a piston 102 in cylinder 98. Low pressure gas is supplied to chamber 82 from a supply tank 104 via reducing valve 106 and check valves 84. The gas is preferably nitrogen.

Prior to the start of the molding cycle, valves 70 and 86 are closed and inert gas is stored in chamber 82 by activating controller 92 and hydraulic cylinder 98 to retract rod 96 and piston 102 down as viewed in FIG. 1. This draws relatively low pressure gas from tank 104, into the empty gas chamber 82. The gas will continue to flow into chamber 82 until the pressure in the chamber equals the pressure of the gas entering from the supply tank 104, which is set by pressure reducing valve 106 and indicated by pressure gages 108. The gas pressure in chamber 82 may be relatively low at say 150 to 250 psi. Check valve assembly 84 prevents gas from returning to tank 104. Cylinder 98 is then actuated to extend rod 96 into chamber 82, compressing the gas in chamber 82 to a desired preset high pressure, for example 2000 psi and higher, as set and indicated at pressure indicator-sensor 90. In general, the gas pressure is set to be at least greater than the plastic injection pressure at sprue bushing 26 and cavity 14. At the desired pressure required, the piston 102 will stop in response to the control signal at lead 94 and stay in the up position until such time, during the subsequent injection operation when the pressure drops below the required preset gas pressure. With chamber 82 fully charged to the desired present pressure, and the valves 70, 84, 86 closed, the molding cycle is in the start position.

To initiate the molding cycle, the molding press clamping unit (now shown) is closed, holding mold halves 10 and 12 closed under a clamping force which is in excess of the plastic melt and gas injection pressures. Under the control of the injection cycle controller (not shown) for machine 22, nozzle shut-off valve 76 is opened and screw 74 is activated to ram molten plastic 110 through nozzle 42, adapter 24, sprue bushing 26 and into the mold cavity 14. As the molten plastic enters the sprue bushing 26 past the gas injection probe 60, valve 86 is immediately opened by the cycle controller, allowing high pressure gas from chamber 82 to flow through line 65, into passages 64 and 62 where it is injected into the melt stream in the sprue passage 38. Preferably gas injection is initiated so that the outlet end of nozzle probe 50 is encapsulated with molten plastic just before the gas flow starts in a manner similar to that disclosed in the above identified Hendry U.S. Pat. No. 4,474,717. During plastic injection exhaust valve 70 remains closed.

As the gas enters the melt stream in the sprue passage 38, the higher gas pressure pushes the molten plastic rapidly to mold cavity 14 and against the cavity walls forming the hollow core 20 as the plastic cools. The pressure of the gas entering the melt stream during plastic injection and maintained in cavity 20 via gas channel 43 during cooling is constant and does not vary significantly during the molding cycle. When the gas pressure in chamber 82 starts to drop, the pressure indicator-sensor 90, actuates controller 92 which moves piston 102 upward to extend rod 96 further into chamber 82 to maintain gas pressure at the preselected level in chamber 82 and core 20.

When screw 74 finishes its forward movement the gas flow will continue for a short period to pack molten plastic against the mold surfaces. Valve 86 is then closed by the cycle controller. For a period of time set by the controller cycle (not shown), this gas pressure is held constant until the molten plastic shell 16 in the mold cavity 14 has cooled sufficiently to be self-supporting. The gas exhaust valve 70 is then opened by the cycle controller to decompress gas from cavity 14, back through the open gas channel 43 in sprue 41, passages 54, 66, line 72 and vent the exhausted gas to the ambient atmosphere via baffle 68. The mold can subsequently be opened and the molded part 16 removed from the mold.

During the decompression time at cavity 14 and between molding cycles, cylinder 98 retracts piston 102 and rod 98. Chamber 82 is recharged and then rod 96 is extended until the gas pressure in chamber 82 reaches the desired setting at indicator on the sensor 90. The system is then ready for a repeat cycle, with valves 86 and 70 closed.

With the arrangement described, the gas injection probe 60 opens in the sprue bushing 36 coaxial with sprue passage 38 in the same direction as the flow of the melt stream. This allows the use of a standard sprue bushing opening at the mold without altering the standard sprue bushing or opening design. This is particularly important in a retrofit since the sprue bushing configuration need not change including where the sprue passage 38 opens into the cavity. Hence, variation in plastic flow parameters are not introduced from standard sprue design.

Another advantage of gas injection at the sprue bushing is the elimination of a cold slug that would be present if the gas is injected and exhausted at the nozzle. When gas is exhausted through the nozzle it cools the nozzle tip slightly causing freeze up and cold slugs.

Considering further advantages of coaxial gas injection of the sprue bushing in the direction of material flow, after the gas inlet has been encapsulated by the melt stream, as the plastic and gas injection continue, an envelope is formed which moves into the mold cavity 14 and expands into the cavity extremities, all while the envelope is sufficiently fluid to expand under the gas pressure. Once the envelope fills the cavity to form shell 18, particularly with constant pressure maintained inside the shell, the shell is packed against the wall until such time as it is self supporting. Coaxial injection of the gas into the melt stream at the sprue bushing provides uniform distribution of the gas and gas pressure forces in the melt stream and the envelope as it expands in the mold cavity. Coaxial gas injection at the sprue bushing also insures that the gas enters the melt stream where it is always viscous. Coaxial injection of the gas at the sprue bushing in the direction of flow of the melt stream also minimizes turbulance in the melt stream which could result in isolated bubbles in the final part.

Although gas injection at the sprue bushing has been described in the preferred embodiment in connection with the constant pressure gas delivery system 28, the advantages are useful with other gas delivery systems, for example of the types disclosed in the above identified prior art.

Similarly, although gas injection at the sprue bushing has been described for retrofitting an existing mold it is equally advantageous with new molds. For new mold applications, inexpensive standard sprue bushings can be used and the adapter 24 fastened to the sprue bushing and preferably silver soldered at interfaces to prevent flash. Where special sprue bushings are required part of the adapter can be manufactured as an integral part of the bushing. However, for retrofitting existing molds or for new mold applications the gas injection mechanism is part of the sprue bushing as contrasted to being in the nozzle or directly in the mold. Hence, no significant modification of either the mold or the injection molding machine is required. If the sprue bushing or the adapter gets worn or damaged, it can simply be removed and replaced.

Although the sprue bushing is preferred for many applications, it will be understood that for some applications the mold does not need to have a sprue bushing. The adapter 24 to provide gas injection would then be mounted on the mold to convey the melt stream to the cavity so that the gas and melt stream enter the mold cavity together. In such applications the part would have some portion, in the nature of a sprue, where the plastic is injected and which is either nonfunctional, part of the runner system or some other portion that is later removed from the finished parts. Hence in the broader sense, the present invention contemplates use of the adapter to inject gas into the melt stream downstream and independent of the nozzle at a sprue or sprue like portion of the part or part runners.

Figure 4:
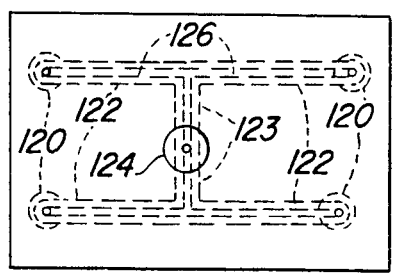
FIG. 4 schematically illustrates a further embodiment of the present invention applied to a mold having four openings in the mold cavity.

FIG. 4 shows a further embodiment of the present invention where the mold cavity (not shown) has four hot sprues 120 commonly known as hot drops. Each hot drop sprue 120 is connected by hot runners 122, 123 to a main sprue bushing 124 that would normally receive plastic from the nozzle of the injection molding machine. By mounting an adapter like adapter 24 at bushing 124, gas can be introduced into the melt stream for distribution to each of the four hot drop sprues 120. To even further insure even gas distribution to each of the hot drop sprues, the gas injection probe can be fashioned to branch into and extend through runners 123, 122 to each of the hot drop sprues 120 as indicated by tubes 126 shown in dotted lines in FIG. 4. The tubes 126 open in the melt stream at each hot drop sprue 120 coaxially therewith and in the direction of material flow into the mold.

The gas delivery system 28 also has advantages over the prior art delivery systems identified above. Gas delivery system 28 maintains constant pressure during injection and cooling in the mold to insure that the part is packed in full contact with the cavity wall until the part is self supporting. Constant pressure is achieved because as soon as any gas is depleted from chamber 82, rod 96 is extended, instantaneously and automatically, into the chamber 28 displacing the depleted gas and maintaining the pressure constant. This is in contrast to constant volume systems where the gas pressure drops off during injection and prior art attempts to achieve substantially constant pressure by pistons, pumps and the like.

Chamber 82, rod 96 and the stroke of piston 102 are selected so that chamber 82 contains more than enough gas for each injection and rod 96 never bottoms out on the chamber walls. Consequently, once chamber 82 is pressurized to the desired preset pressure, the pressure can be maintained constant throughout injection by displacing the gas as it is used. This is also in contrast to using a piston in a gas compression cylinder because more than sufficient pressurized gas for each injection is stored in chamber 82. Rod 96 does not require piston rings or other dry sliding seals in chamber 82. Introduction of lubricants into the gas would impair the surface finish or create unwanted surface and other bubbles in the part. Although seal 100 is wetted by hydraulic fluid in cylinder 98, the design of such metal seals to prevent hydraulic fluid from leaking into chamber 82 is well known. Since no additional heat is generated in chamber 82 by friction of moving seals, longer life and more reliable operation is achieved.

As indicated earlier, gas delivery system 28 is a high pressure system. Although the preset pressure will vary depending on the molding parameters for each application, generally gas pressures in the range of 2,000 to 7,000 psi and even higher are contemplated, the gas injection pressure is selected to be above the melt pressure where the gas is injected. Typically, general purpose polymers such as polyproplyene and polyethylene are at the lower end of the range, say 1,800 psi in the sprue bushing 26 where the gas would be injected at a slightly higher pressure in excess of 2,000 psi. With glass and mica filled nylon, ABS, and LEXAN, for example, at the upper end of the range higher melt pressures of 3,500 to 7,000 psi might be present and the gas pressure preset at indicator-sensor 90 would again be above the melt pressure.

Although gas injection at sprue bushing 26 can be used with various gas delivery systems and gas delivery system 28 can be used to inject gas at locations other than the sprue bushing, the combination of gas injection at the sprue bushing using the constant gas pressure of gas delivery system 28 is preferred. The two features are particularly compatible to achieve a better molded part. The melt stream is still highly viscous at the sprue bushing and at pressures that allow gas injected at constant pressures to achieve effective coring of the molded part and smooth surfaces that do not require finishing.

It will be understood that the injection molding apparatus and method have been described hereinabove for purposes of illustration and are not intended to indicate limits and modifications of the present invention, the scope of which is defined by the following claims.

We claim:

1. In a gas assisted plastic molding apparatus having a mold, sprue means carried by said mold and having a sprue bushing defining a sprue passage communicating with a molding cavity in said mold, a gas delivery system, and means for injecting a melt stream of molten plastic through said sprue means in a direction from said injection means toward said cavity, said plastic injection means having a nozzle, the improvement comprising gas injection means located between said nozzle and said sprue bushing when said plastic injection means is operatively associated with said mold, said gas injection means being adapted for connection to said gas delivery system, said gas injection means comprising an adapter having an end face abutting an end face of said sprue bushing, and being attached thereto, said gas injection means further having a gas injection probe extending forwardly of said adapter and into said sprue bushing at said sprue passage to inject gas into molten plastic passing through said sprue passage.

2. The molding apparatus set forth in claim 1 wherein said sprue means is a sprue bushing removably mounted in said mold and said gas injection means is adapter means mounted on said bushing at an end thereof remote from said cavity for engagement with said nozzle.

3. The molding apparatus set forth in claim 2 wherein said adapter means has said passage therethrough for conducting a melt stream of molten plastic from said nozzle into said sprue passage and wherein said gas injection probe communicates directly with said melt stream in said sprue passage.

4. The molding apparatus set forth in claim 3 wherein said adapter means has a gas inlet passage and a gas exhaust passage both of which communicate with said gas injection opening.

5. The molding apparatus set forth in claim 3 where said gas injection probe is substantially coaxial with said sprue passage and opens substantially in said direction of melt stream flow through said adapter and said sprue bushing.

6. The molding apparatus set forth in claim 5 wherein said adapter has a generally torpedo-shaped web extending transversely of said adapter passage, said web having a gas inlet passage and a gas exhaust passage both of which communicate with a gas injection passage, said gas injection passage forming said gas injection opening substantially coaxial with said melt stream.

7. The molding apparatus set forth in claim 6 wherein said gas injection passage extends substantially coaxially into said sprue passage.

8. The molding apparatus set forth in claim 2 wherein said sprue means is a standard sprue bushing made of hardened steel and having a polished sprue passage and a head portion having a nozzle seat therein, and wherein said adapter is mounted on said head portion, said adapter also being made of steel and having a nozzle seat to engage said nozzle.

9. The molding apparatus set forth in claim 2 wherein said adapter means is an integral part of said sprue bushing.

* * * * *